United States Patent
Naruse et al.

(10) Patent No.: US 7,932,300 B2
(45) Date of Patent: Apr. 26, 2011

(54) ENERGY BEAM CURABLE TYPE INK JET PRINTING INK

(75) Inventors: Hidenori Naruse, Chuo-ku (JP); Shingo Naruse, Chuo-ku (JP); Shingo Tanaka, Chuo-ku (JP)

(73) Assignee: JSR Corporation, Tokyo (JP)

( * ) Notice: Subject to any disclaimer, the term of this patent is extended or adjusted under 35 U.S.C. 154(b) by 101 days.

(21) Appl. No.: 12/298,304

(22) PCT Filed: Apr. 24, 2007

(86) PCT No.: PCT/JP2007/059340
§ 371 (c)(1),
(2), (4) Date: Oct. 24, 2008

(87) PCT Pub. No.: WO2007/126103
PCT Pub. Date: Nov. 8, 2007

(65) Prior Publication Data
US 2009/0118388 A1    May 7, 2009

(30) Foreign Application Priority Data
Apr. 28, 2006   (JP) .................... 2006-126561

(51) Int. Cl.
*C09D 11/00* (2006.01)
*B41J 2/01* (2006.01)
*B41M 5/00* (2006.01)

(52) U.S. Cl. .............. 522/8; 522/9; 522/16; 522/39; 522/75; 522/83; 522/167; 522/173; 522/182

(58) Field of Classification Search ............ 522/8, 9, 522/16, 39, 75, 83, 167, 173, 182
See application file for complete search history.

(56) References Cited

U.S. PATENT DOCUMENTS

| | | |
|---|---|---|
| 6,145,979 A | 11/2000 | Caiger et al. |
| 6,593,390 B1 * | 7/2003 | Johnson et al. ............ 522/74 |
| 2005/0245632 A1 | 11/2005 | Balmer et al. |
| 2006/0100298 A1 | 5/2006 | Ulrich et al. |
| 2007/0042162 A1 * | 2/2007 | Selman et al. ........ 428/195.1 |

FOREIGN PATENT DOCUMENTS

| | | |
|---|---|---|
| EP | 1 561 792 A1 | 8/2005 |
| JP | 60-132767 | 7/1985 |
| JP | 8-259876 | 10/1996 |
| JP | 2004-526820 | 9/2004 |
| JP | 2005-234362 | 9/2005 |
| JP | 2005-316012 | 11/2005 |
| WO | WO 02/061001 A1 | 8/2002 |
| WO | 2004 037799 | 5/2004 |

* cited by examiner

*Primary Examiner* — Susan W Berman
(74) *Attorney, Agent, or Firm* — Oblon, Spivak, McClelland, Maier & Neustadt, L.L.P.

(57) ABSTRACT

An energy beam curable type ink jet printing ink comprising (A) a colorant, (B) a compound having at least one ethylenically unsaturated bond which can be polymerized by the application of an energy beam and (C) a photopolymerization initiator, wherein the component (B) is a compound having at least one methacryloyl group as a sole polymerizable unsaturated group and the component (C) is a 2-alkyl-2-amino-2-benzyl-1-(4-morpholinophenyl)ethan-1-one.

This ink has low viscosity, high sensitivity and sufficiently high film strength after curing.

20 Claims, No Drawings

ENERGY BEAM CURABLE TYPE INK JET PRINTING INK

TECHNICAL FIELD

The present invention relates to an energy beam curable type ink jet printing ink which is used for ink jet printing and is cured by the application of an energy beam such as ultraviolet radiation, far ultraviolet radiation, visible radiation, X-ray or electron beam.

BACKGROUND ART

Active studies have recently been made on an ink jet printing technology using an energy beam such as ultraviolet radiation (refer to JP-A 2004-526820). This printing technology is to apply a liquid ink to the surface of a material to be printed such as paper or plastic by an ink jet system and apply, for example, ultraviolet radiation to the ink to crosslink or cure it. Since this printing technology has advantages that the ink is dried quickly and does not contain a solvent and that a material to be printed which does not absorb an ink can be printed unlike a conventional printing technology in which an ink is crosslinked or cured by heat, it is attracting attention.

For ink jet printing, the ink desirably has a viscosity of 30 mPa·s or less at normal temperature to ensure continuous ejection stability from a nozzle head and prevent the clogging of the nozzle head. However, since a high-viscosity component such as a polymer or crosslinking agent must be used to increase the strength of a film after crosslinking or curing, the reduction of viscosity and the strength of the film have a trade-off relationship. Although an acrylic ester has been used as a reactive diluent to reduce the viscosity of a printing ink, a low molecular weight acrylic ester having a molecular weight of 300 or less generally has high skin irritancy and accordingly, its amount is limited. Therefore, there has been limitation to the reduction of viscosity with the acrylic ester. Then, there is proposed use of a methacrylic ester having low skin irritancy and a low molecular weight. However, as the methacrylic ester generally has a lower curing rate than the acrylic ester, it is disadvantageous in terms of productivity, and the strength of the cured film is not satisfactory.

DISCLOSURE OF THE INVENTION

It is an object of the present invention to provide an energy beam curable type ink jet printing ink which has low viscosity and high sensitivity and provides sufficiently high film strength after curing.

Other objects and advantages of the present invention will become apparent from the following description.

According to the present invention, the above objects and advantages of the present invention are attained by an energy beam curable type ink jet printing ink comprising (A) a colorant, (B) a compound having at least one ethylenically unsaturated bond which can be polymerized by the application of an energy beam and (C) a photopolymerization initiator, wherein the component (B) is a compound having at least one methacryloyl group as a sole polymerizable unsaturated group, and the component (C) is a compound represented by the following formula (1):

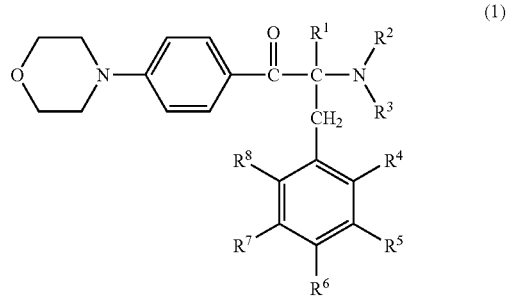

wherein $R^1$ is a linear, branched or cyclic alkyl group having 1 to 12 carbon atoms, $R^2$ and $R^3$ are each independently a hydrogen atom; a linear, branched or cyclic alkyl group having 1 to 12 carbon atoms; or a benzyl group, $R^4$, $R^5$, $R^7$ and $R^8$ are each independently a hydrogen atom; a halogen atom; a linear, branched or cyclic alkyl group having 1 to 12 carbon atoms; or a linear or branched alkoxy group having 1 to 4 carbon atoms, and $R^6$ is a halogen atom; a linear, branched or cyclic alkyl group having 1 to 12 carbon atoms; a linear, branched or cyclic alkyl group having 1 to 12 carbon atoms substituted by a substituent selected from the group consisting of a hydroxyl group and a linear or branched alkoxyl group having 1 to 4 carbon atoms; a linear or branched alkoxyl group having 1 to 4 carbon atoms; or a linear or branched alkoxyl group having 2 to 4 carbon atoms substituted by a substituent selected from the group consisting of a hydroxyl group and a linear or branched alkoxyl group having 1 to 4 carbon atoms.

The present invention will be described in detail hereinunder.

BEST MODE FOR CARRYING OUT THE INVENTION

(A) Colorant

The colorant in the present invention is not limited to a particular color and is suitably selected according to application purpose. It may be a pigment, dye or natural coloring matter.

A colorant having high color developability and high heat resistance, especially a colorant having high thermal decomposition resistance is preferred as the colorant in the present invention. An organic pigment or inorganic pigment is commonly used, and an organic pigment and carbon black are particularly preferably used.

Examples of the above organic pigment are compounds classified into a group of pigments according to color index (C.I.; issued by The Society of Dyers and Colourists), specifically compounds having the following color index (C.I.) numbers:

C.I. Pigment Yellow 1, C.I. Pigment Yellow 3, C.I. Pigment Yellow 12, C.I. Pigment Yellow 13, C.I. Pigment Yellow 14, C.I. Pigment Yellow 15, C.I. Pigment Yellow 16, C.I. Pigment Yellow 17, C.I. Pigment Yellow 20, C.I. Pigment Yellow 24, C.I. Pigment Yellow 31, C.I. Pigment Yellow 55, C.I. Pigment Yellow 60, C.I. Pigment Yellow 61, C.I. Pigment Yellow 65, C.I. Pigment Yellow 71, C.I. Pigment Yellow 73, C.I. Pigment Yellow 74, C.I. Pigment Yellow 81, C.I. Pigment Yellow 83, C.I. Pigment Yellow 93, C.I. Pigment Yellow 95, C.I. Pigment Yellow 97, C.I. Pigment Yellow 98, C.I. Pigment Yellow 100, C.I. Pigment Yellow 101, C.I. Pigment Yellow 104, C.I. Pigment Yellow 106, C.I. Pigment Yellow 108, C.I. Pigment Yellow 109, C.I. Pigment Yellow 110, C.I. Pigment Yellow 113, C.I. Pigment Yellow 114, C.I. Pigment Yellow 116, C.I. Pigment Yellow 117, C.I. Pigment Yellow 119, C.I. Pigment Yellow 120, C.I. Pigment Yellow 126, C.I. Pigment Yellow 127, C.I. Pigment Yellow 128, C.I. Pigment Yellow 129, C.I. Pigment Yellow 138, C.I. Pigment Yellow 139, C.I. Pigment Yellow 150, C.I. Pigment Yellow 151, C.I. Pigment Yellow 152, C.I. Pigment Yellow 153, C.I. Pigment Yellow 154, C.I. Pigment Yellow 155, C.I. Pigment Yellow 156, C.I. Pigment Yellow 166, C.I. Pigment Yellow 168, C.I. Pigment Yellow 175, C.I. Pigment Yellow 180 and C.I. Pigment Yellow 185;

C.I. Pigment Orange 1, C.I. Pigment Orange 5, C.I. Pigment Orange 13, C.I. Pigment Orange 14, C.I. Pigment Orange 16, C.I. Pigment Orange 17, C.I. Pigment Orange 24, C.I. Pigment Orange 34, C.I. Pigment Orange 36, C.I. Pigment Orange 38, C.I. Pigment Orange 40, C.I. Pigment Orange 43, C.I. Pigment Orange 46, C.I. Pigment Orange 49, C.I. Pigment Orange 51, C.I. Pigment Orange 61, C.I. Pigment Orange 63, C.I. Pigment Orange 64, C.I. Pigment Orange 71 and C.I. Pigment Orange 73;

C.I. Pigment Violet 1, C.I. Pigment Violet 19, C.I. Pigment Violet 23, C.I. Pigment Violet 29, C.I. Pigment Violet 32, C.I. Pigment Violet 36 and C.I. Pigment Violet 38;

C.I. Pigment Red 1, C.I. Pigment Red 2, C.I. Pigment Red 3, C.I. Pigment Red 4, C.I. Pigment Red 5, C.I. Pigment Red 6, C.I. Pigment Red 7, C.I. Pigment Red 8, C.I. Pigment Red 9, C.I. Pigment Red 10, C.I. Pigment Red 11, C.I. Pigment Red 12, C.I. Pigment Red 14, C.I. Pigment Red 15, C.I. Pigment Red 16, C.I. Pigment Red 17, C.I. Pigment Red 18, C.I. Pigment Red 19, C.I. Pigment Red 21, C.I. Pigment Red 22, C.I. Pigment Red 23, C.I. Pigment Red 30, C.I. Pigment Red 31, C.I. Pigment Red 32, C.I. Pigment Red 37, C.I. Pigment Red 38, C.I. Pigment Red 40, C.I. Pigment Red 41, C.I. Pigment Red 42, C.I. Pigment Red 48:1, C.I. Pigment Red 48:2, C.I. Pigment Red 48:3, C.I. Pigment Red 48:4, C.I. Pigment Red 49:1, C.I. Pigment Red 49:2, C.I. Pigment Red 50:1, C.I. Pigment Red 52:1, C.I. Pigment Red 53:1, C.I. Pigment Red 57, C.I. Pigment Red 57:1, C.I. Pigment Red 57:2, C.I. Pigment Red 58:2, C.I. Pigment Red 58:4, C.I. Pigment Red 60:1, C.I. Pigment Red 63:1, C.I. Pigment Red 63:2, C.I. Pigment Red 64:1, C.I. Pigment Red 81:1, C.I. Pigment Red 83, C.I. Pigment Red 88, C.I. Pigment Red 90:1, C.I. Pigment Red 97, C.I. Pigment Red 101, C.I. Pigment Red 102, C.I. Pigment Red 104, C.I. Pigment Red 105, C.I. Pigment Red 106, C.I. Pigment Red 108, C.I. Pigment Red 112, C.I. Pigment Red 113, C.I. Pigment Red 114, C.I. Pigment Red 122, C.I. Pigment Red 123, C.I. Pigment Red 144, C.I. Pigment Red 146, C.I. Pigment Red 149, C.I. Pigment Red 150, C.I. Pigment Red 151, C.I. Pigment Red 166, C.I. Pigment Red 168, C.I. Pigment Red 170, C.I. Pigment Red 171, C.I. Pigment Red 172, C.I. Pigment Red 174, C.I. Pigment Red 175, C.I. Pigment Red 176, C.I. Pigment Red 177, C.I. Pigment Red 178, C.I. Pigment Red 179, C.I. Pigment Red 180, C.I. Pigment Red 185, C.I. Pigment Red 187, C.I. Pigment Red 188, C.I. Pigment Red 190, C.I. Pigment Red 193, C.I. Pigment Red 194, C.I. Pigment Red 202, C.I. Pigment Red 206, C.I. Pigment Red 207, C.I. Pigment Red 208, C.I. Pigment Red 209, C.I. Pigment Red 215, C.I. Pigment Red 216, C.I. Pigment Red 220, C.I. Pigment Red 224, C.I. Pigment Red 226, C.I. Pigment Red 242, C.I. Pigment Red 243, C.I. Pigment Red 245, C.I. Pigment Red 254, C.I. Pigment Red 255, C.I. Pigment Red 264 and C.I. Pigment Red 265;

C.I. Pigment Blue 15, C.I. Pigment Blue 15:3, C.I. Pigment Blue 15:4, C.I. Pigment Blue 15:6 and C.I. Pigment Blue 60; C.I. Pigment Green 7 and C.I. Pigment Green 36;

C.I. Pigment Brown 23 and C.I. Pigment Brown 25; C.I. Pigment White 6; and C.I. Pigment Black 1 and C.I. Pigment Black 7.

These organic pigments may be purified by sulfuric acid re-crystallization, solvent cleaning or a combination thereof before use.

Examples of the above inorganic pigment include titanium oxide, barium sulfate, calcium carbonate, zinc white, lead sulfate, yellow lead, zinc yellow, red iron oxide (red iron oxide (III)), cadmium red, ultramarine, Prussian blue, chromium oxide green, cobalt green, amber, titanium black, synthetic iron black and carbon black.

In the present invention, the above organic pigments and inorganic pigments may be used alone or in combination of two or more, respectively, or both may be used in combination. One or more organic pigments are preferably used to print a color other than black, and two or more organic pigments and/or carbon black are preferably used to print black.

In the present invention, the surface of the particle of each of the above pigments may be optionally modified by a polymer before use. Examples of the polymer used to modify the surface of the particle of the pigment include polymers disclosed by JP-A 8-259876 and commercially available polymers and oligomers for dispersing a pigment.

In the present invention, optionally, the colorant may be used in conjunction with a dispersant.

The dispersant is, for example, a cationic, anionic, nonionic, amphoteric, silicone-based or fluorine-based surfactant.

Examples of the above surfactant include polyoxyethylene alkyl ethers such as polyoxyethylene lauryl ether, polyoxyethylene stearyl ether and polyoxyethylene oleyl ether; polyoxyethylene alkylphenyl ethers such as polyoxyethylene n-octylphenyl ether and polyoxyethylene n-nonylphenyl ether; polyethylene glycol diesters such as polyethylene glycol dilaurate and polyethylene glycol distearate; sorbitan fatty acid esters; fatty acid modified polyesters; tertiary amine modified polyurethanes; and polyethyleneimines. These surfactants are available on the market under the trade names of KP (of Shin-Etsu Chemical, Co., Ltd.), Polyflow (of Kyoeisya Chemical Co., Ltd.), F Top (of Tokem Products Co., Ltd.), Megafac (of Dainippon Ink and Chemicals, Inc.), Florade (of Sumitomo 3M Limited), Asahi Guard and Surflon (of Asahi Glass Co., Ltd.), Disperbyk (of BYK Chemie Japan Co., Ltd.), and Solsperse (of Seneka Co., Ltd.).

These surfactants may be used alone or in combination of two or more.

The amount of the surfactant is preferably 50 parts or less by weight, more preferably 0 to 30 parts by weight based on 100 parts by weight of the colorant.

The content of the colorant in the energy beam curable type ink jet printing ink of the present invention is preferably 0.5 to 10 wt %, more preferably 1 to 5 wt %. When the content of the colorant is lower than 0.5 wt %, sufficiently high color density may not be obtained and when the content is higher than 10 wt %, ejection stability from the nozzle head tends to deteriorate.

The energy beam curable type ink jet printing ink of the present invention can be prepared by a suitable method. For example, it can be prepared by mixing together the components (A), (B) and (C) in accordance with a commonly used method. When a pigment is used as the colorant, it can be prepared by mixing and dispersing the pigment in the presence of a dispersant while the pigment is ground by a bead mill or roll mill to prepare a pigment dispersion and adding the components (B) to (C) to the pigment dispersion.

(B) photopolymerizable Unsaturated Compound

The compound having at least one ethylenically unsaturated bond which is polymerizable with an energy beam in the present invention (to be referred to as "photopolymerizable unsaturated compound" hereinafter) comprises a compound having at least one methacryloyl group ($CH_2$=$C(CH_3)$—CO—) as a sole polymerizable unsaturated group (to be referred to as "methacrylic compound" hereinafter).

The methacrylic compound is preferably selected from a compound represented by the following formula (2-1) (to be referred to as "methacrylic compound (2-1)" hereinafter), a compound represented by the following formula (2-2) (to be referred to as "methacrylic compound (2-2)" hereinafter), a compound represented by the following formula (3-1) (to be referred to as "methacrylic compound (3-1)" hereinafter) and a compound represented by the following formula (3-2) (to be referred to as "methacrylic compound (3-2)" hereinafter).

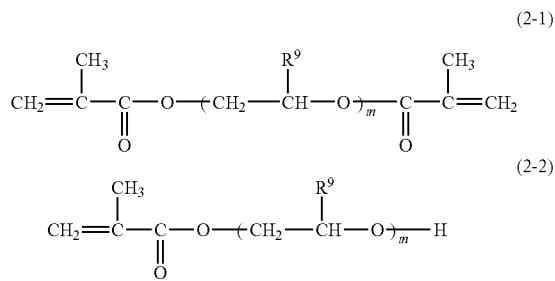

[In the formulas (2-1) and (2-2), $R^9$ is a hydrogen atom or methyl group, and m is an integer of 1 to 5.]

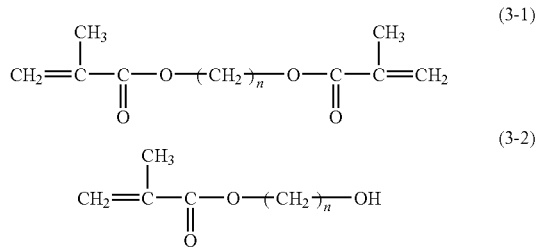

[In the formulas (3-1) and (3-2), n is an integer of 3 to 9.]

Example of the methacrylic compound (2-1) and the methacrylic compound (2-2) include ethylene glycol dimethacrylate, ethylene glycol monomethacrylate, di(ethylene glycol)dimethacrylate, di(ethylene glycol)monomethacrylate, tri(ethylene glycol)dimethacrylate, tri(ethylene glycol)monomethacrylate, tetra(ethylene glycol)dimethacrylate and tetra(ethylene glycol)monomethacrylate.

Example of the methacrylic compound (3-1) and the methacrylic compound (3-2) include 1,3-propanediol dimethacrylate, 1,3-propanediol monomethacrylate, 1,4-butanediol dimethacrylate, 1,4-butanediol monomethacrylate, 1,5-pentanediol dimethacrylate, 1,5-pentanediol monomethacrylate, 1,6-hexanediol dimethacrylate and 1,6-hexanediol monomethacrylate.

Out of these methacrylic compounds, ethylene glycol dimethacrylate, ethylene glycol monomethacrylate, di(ethylene glycol)dimethacrylate, di(ethylene glycol)monomethacrylate, tri(ethylene glycol)dimethacrylate, tri(ethylene glycol)monomethacrylate, 1,3-propanediol dimethacrylate, 1,3-propanediol monomethacrylate, 1,4-butanediol dimethacrylate and 1,4-butanediol monomethacrylate are preferred, and ethylene glycol dimethacrylate and di(ethylene glycol)dimethacrylate are particularly preferred because they have low viscosity.

In the present invention, the methacrylic compounds may be used alone or in combination of two or more.

In the present invention, the amount of the methacrylic compound is preferably 2 to 100 parts by weight, more preferably 5 to 90 parts by weight based on 2 parts by weight of the colorant (A). When the amount of the methacrylic compound is smaller than 2 parts by weight, ejection stability from the nozzle head may deteriorate and when the amount is larger than 100 parts by weight, curability may lower or the cured film may become brittle and easily break.

<Acrylic Compound>

In the present invention, a compound excluding a methacrylic compound (to be referred to as "other photopolymerizable unsaturated compound" hereinafter) may be used as a photopolymerizable unsaturated compound together with a methacrylic compound.

The other photopolymerizable unsaturated compound is, for example, a compound having at least one acryloyl group ($CH_2$=CH—CO—) (to be referred to as "acrylic compound" hereinafter) or a compound having at least one vinyl group ($CH_2$=CH—) (to be referred to as "vinyl-based compound" hereinafter).

Examples of the acrylic compound include tetrahydrofurfuryl acrylate, 2-phenoxyethyl acrylate, phenoxydiethylene glycol acrylate, isobornyl acrylate, ethylene glycol diacrylate, ethylene glycol monoacrylate, di(ethylene glycol)diacrylate, di(ethylene glycol)monoacrylate, tri(ethylene glycol)diacrylate, tri(ethylene glycol)monoacrylate, tetra(ethylene glycol)diacrylate, tetra(ethylene glycol)monoacrylate, poly(ethylene glycol)monoacrylate (the number of the ethylene glycol units is 5 to 9, the same shall apply hereinunder), 1,3-propanediol diacrylate, 1,3-propanediol monoacrylate, 1,4-butanediol diacrylate, 1,4-butanediol monoacrylate, 1,5-pentanediol diacrylate, 1,5-pentanediol monoacrylate, 1,6-hexanediol diacrylate, 1,6-hexanediol monoacrylate, dimethyloltricyclodecane diacrylate, monomethyloltricyclodecane monoacrylate, trimethylolpropane monoacrylate, trimethylolpropane diacrylate, trimethylolpropane triacrylate, pentaerythritol diacrylate, pentaerythritol triacrylate, pentaerythritol tetraacrylate, dipentaerythritol pentaacrylate, dipentaerythritol hexaacrylate and ethoxylated pentaerythritol tetraacrylate (tetraacrylate of an addition reaction product between pentaerythritol and ethylene oxide).

Out of these acrylic compounds, isobornyl acrylate, tetra(ethylene glycol)diacrylate, tetra(ethylene glycol)monoacrylate, poly(ethylene glycol)diacrylate, poly(ethylene glycol) monoacrylate, 1,6-hexanediol diacrylate, 1,6-hexanediol monoacrylate, pentaerythritol tetraacrylate, dipentaerythritol pentaacrylate, dipentaerythritol hexaacrylate and ethoxylated pentaerythritol tetraacrylate are preferred, and isobornyl acrylate, tetra(ethylene glycol)diacrylate, tetra(ethylene glycol)monoacrylate, poly(ethylene glycol)monoacrylate, pentaerythritol tetraacrylate, dipentaerythritol pentaacrylate, dipentaerythritol hexaacrylate and ethoxylated pentaerythritol tetraacrylate are particularly preferred because they have low skin irritancy.

<Vinyl-Based Compound>

Examples of the vinyl-based compound include N-vinylpyrrolidone, N-vinyl-ε-caprolactam, ethylene glycol divinyl ether, ethylene glycol monovinyl ether, di(ethylene glycol)divinyl ether, di(ethylene glycol)monovinyl ether, tri(ethylene glycol)divinyl ether, tri(ethylene glycol)monovinyl ether, tetra(ethylene glycol)divinyl ether, tetra(ethylene glycol)monovinyl ether, 2-(2-vinyloxyethoxy)ethyl acrylate and 2-(2-vinyloxyethoxy)ethyl methacrylate.

Out of these vinyl-based compounds, N-vinylpyrrolidone, N-vinyl-ε-caprolactam, ethylene glycol divinyl ether, ethylene glycol monovinyl ether, di(ethylene glycol)divinyl ether, di(ethylene glycol)monovinyl ether, tri(ethylene glycol)divinyl ether, tri(ethylene glycol)monovinyl ether, 2-(2'-vinyloxyethoxy)ethyl acrylate and 2-(2'-vinyloxyethoxy)ethyl methacrylate are preferred, and N-vinylpyrrolidone, N-vinyl-ε-caprolactam, di(ethylene glycol)divinyl ether, di(ethylene glycol)monovinyl ether, tri(ethylene glycol)divinyl ether, tri(ethylene glycol)monovinyl ether, 2-(2-vinyloxyethoxy)ethyl acrylate and 2-(2-vinyloxyethoxy)ethyl methacrylate are particularly preferred because they have low viscosity.

The above other photopolymerizable unsaturated compounds may be used alone or in combination of two or more.

In the present invention, the amount of the other photopolymerizable unsaturated compound is preferably 400 parts or less by weight, more preferably 5 to 400 parts by weight, much more preferably 30 to 230 parts by weight based on 20 parts by weight of the methacrylic compound. When the amount of the other photopolymerizable unsaturated compound is larger than 400 parts by weight, ejection stability from the nozzle head may deteriorate. When the amount of the other photopolymerizable unsaturated compound is smaller than 5 parts by weight, the strength of the cured film may lower due to incomplete curing.

(C) Photopolymerization Initiator

The photopolymerization initiator in the present invention comprises a component which is represented by the above formula (1) (to be referred to as "photopolymerization initiator (1)" hereinafter) as an essential component and forms active species capable of initiating the polymerization of the photopolymerizable unsaturated compound (B) upon exposure to an energy beam (to be referred to as "exposure" hereinafter).

In the formula (1), examples of the linear, branched or cyclic alkyl group having 1 to 12 carbon atoms represented by $R^1, R^2, R^3, R^4, R^5, R^6, R^7$ and $R^8$ include methyl group, ethyl group, n-propyl group, i-propyl group, n-butyl group, i-butyl group, sec-butyl group, t-butyl group, n-pentyl group, n-hexyl group, n-heptyl group, n-octyl group, n-nonyl group, n-decyl group, n-undecyl group, n-dodecyl group, cyclopentyl group and cyclohexyl group.

Examples of the halogen atom represented by $R^4, R^5, R^6, R^7$ and $R^8$ include fluorine atom, chlorine atom and bromine atom.

Examples of the linear or branched alkoxyl group having 1 to 4 carbon atoms represented by $R^4, R^5, R^6, R^7$ and $R^8$ include methoxy group, ethoxy group, n-propoxy group, i-propoxy group, n-butoxy group, i-butoxy group, sec-butoxy group and t-butoxy group.

Examples of the linear, branched or cyclic alkyl group having 1 to 12 carbon atoms substituted and represented by $R^6$ are the same as those listed for the linear, branched or cyclic alkyl group having 1 to 12 carbon atoms represented by $R^1, R^2, R^3, R^4, R^5, R^6, R^7$ and $R^8$.

In the linear, branched or cyclic alkyl group having 1 to 12 carbon atoms substituted by a substituent selected from the group consisting of the hydroxyl group and the linear or branched alkoxyl group having 1 to 4 carbon atoms and represented by $R^6$, examples of the linear or branched alkoxyl group having 1 to 4 carbon atoms are the same as those listed for the linear or branched alkoxyl group having 1 to 4 carbon atoms represented by $R^4, R^5, R^6, R^7$ and $R^8$.

Examples of the linear or branched alkoxyl group having 2 to 4 carbon atoms substituted and represented by $R^6$ include ethoxy group, n-propoxy group, i-propoxy group, n-butoxy group, i-butoxy group, sec-butoxy group and t-butoxy group.

In the linear or branched alkoxyl group having 2 to 4 carbon atoms substituted by a substituent selected from the group consisting of the hydroxyl group and the linear or branched alkoxyl group having 1 to 4 carbon atoms and represented by $R^6$, examples of the linear or branched alkoxyl group having 1 to 4 carbon atoms are the same as those listed for the linear or branched alkoxyl group having 1 to 4 carbon atoms represented by $R^4, R^5, R^6, R^7$ and $R^8$.

In the formula (1), $R^1$ is preferably a methyl group, ethyl group, n-propyl group, i-propyl group, n-butyl group, i-butyl group, sec-butyl group, t-butyl group, n-pentyl group or n-hexyl group.

$R^2$ and $R^3$ are each preferably a methyl group, ethyl group, n-propyl group, i-propyl group, n-butyl group, i-butyl group, sec-butyl group, t-butyl group, n-pentyl group, n-hexyl group, n-heptyl group or n-octyl group.

$R^4, R^5, R^7$ and $R^8$ are each preferably a hydrogen atom, methyl group or ethyl group.

$R^6$ is preferably a methyl group, ethyl group, n-propyl group, i-propyl group, n-butyl group, i-butyl group, sec-butyl group, t-butyl group, n-pentyl group, n-hexyl group, n-heptyl group, n-octyl group, n-decyl group, n-dodecyl group, hydroxymethyl group, 2-hydroxyethyl group, methoxymethyl group, 2-methoxyethyl group, methoxy group, ethoxy group, n-propoxy group, i-propoxy group, n-butoxy group, hydroxymethoxy group, 2-hydroxyethoxy group, methoxymethoxy group or 2-methoxyethoxy group.

Examples of the preferred photopolymerization initiator (1) in the present invention include
2-(4-methylbenzyl)-2-(dimethylamino)-1-(4-morpholinophenyl)butan-1-one,
2-(4-ethylbenzyl)-2-(dimethylamino)-1-(4-morpholinophenyl)butan-1-one,
2-(4-i-propylbenzyl)-2-(dimethylamino)-1-(4-morpholinophenyl)butan-1-one,
2-(4-n-butylbenzyl)-2-(dimethylamino)-1-(4-morpholinophenyl)butan-1-one,
2-(4-i-butylbenzyl)-2-(dimethylamino)-1-(4-morpholinophenyl)butan-1-one,
2-(4-n-dodecylbenzyl)-2-(dimethylamino)-1-(4-morpholinophenyl)butan-1-one,
2-(3,4-dimethylbenzyl)-2-(dimethylamino)-1-(4-morpholinophenyl)butan-1-one,
2-(4-methoxybenzyl)-2-(dimethylamino)-1-(4-morpholinophenyl)butan-1-one,
2-(4-ethoxybenzyl)-2-(dimethylamino)-1-(4-morpholinophenyl)butan-1-one,
2-(4-hydroxymethylbenzyl)-2-(dimethylamino)-1-(4-morpholinophenyl)butan-1-one,
2-[4-(2-hydroxyethoxy)benzyl]-2-(dimethylamino)-1-(4-morpholinophenyl)butan-1-one,
2-[4-(2-methoxyethoxy)benzyl]-2-(dimethylamino)-1-(4-morpholinophenyl)butan-1-one,
2-(4-i-propylbenzyl)-2-[(n-butyl)(methyl)amino]-1-(4-morpholinophenyl)butan-1-one,
2-(4-n-butylbenzyl)-2-[(n-butyl)(methyl)amino]-1-(4-morpholinophenyl)butan-1-one,
2-(4-i-propylbenzyl)-2-(dimethylamino)-1-(4-morpholinophenyl)pentan-1-one,
2-(4-i-butylbenzyl)-2-[(n-butyl)(methyl)amino]-1-(4-morpholinophenyl)pentan-1-one,
2-(4-n-butoxybenzyl)-2-[(n-butyl)(methyl)amino]-1-(4-morpholinophenyl)pentan-1-one, 2-(4-methylbenzyl)-2-[di(n-octyl)amino]-1-(4-morpholinophenyl)hexan-1-one and 2-(4-n-dodecylbenzyl)-2-(dimethylamino)-1-(4-morpholinophenyl)octan-1-one.

Out of these photopolymerization initiators (1), 2-(4-methylbenzyl)-2-(dimethylamino)-1-(4-morpholinophenyl)butan-1-one,
2-(4-ethylbenzyl)-2-(dimethylamino)-1-(4-morpholinophenyl)butan-1-one and
2-(4-i-propylbenzyl)-2-(dimethylamino)-1-(4-morpholinophenyl)butan-1-one are preferred.

In the present invention, the photopolymerization initiators (1) may be used alone or in combination of two or more.

In the present invention, the photopolymerization initiator (1) may be used in combination with other photopolymerization initiator.

The other photopolymerization initiator is selected from a biimidazole-based compound having at least one main skeleton represented by the following formula (4-1), (4-2) or (4-3), acetophenone-based compound, benzophenone-based compound, benzoin-based compound, α-diketone-based compound, polynuclear quinone-based compound, xanthone-based compound, phosphine-based compound, triazine-based compound and carbazole-based compound.

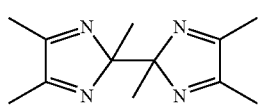

(4-1)

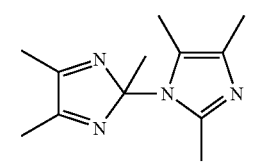

(4-2)

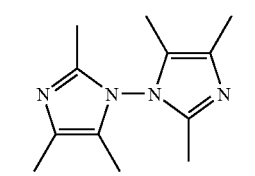

(4-3)

Examples of the above biimidazole-based compound include 2,2'-bis(2-chlorophenyl)-4,4',5,5'-tetrakis(4-ethoxycarbonylphenyl)-1,2'-biimidazole,
2,2'-bis(2-bromophenyl)-4,4',5,5'-tetrakis(4-ethoxycarbonylphenyl)-1,2'-biimidazole,
2,2'-bis(2-chlorophenyl)-4,4',5,5'-tetraphenyl-1,2'-biimidazole,
2,2'-bis(2,4-dichlorophenyl)-4,4',5,5'-tetraphenyl-1,2'-biimidazole,
2,2'-bis(2,4,6-trichlorophenyl)-4,4',5,5'-tetraphenyl-1,2'-biimidazole,
2,2'-bis(2-bromophenyl)-4,4',5,5'-tetraphenyl-1,2'-biimidazole,
2,2'-bis(2,4-dibromophenyl)-4,4',5,5'-tetraphenyl-1,2'-biimidazole and 2,2'-bis(2,4,6-tribromophenyl)-4,4',5,5'-tetraphenyl-1,2'-biimidazole.

Out of the above biimidazole-based compounds, 2,2'-bis(2-chlorophenyl)-4,4',5,5'-tetraphenyl-1,2'-biimidazole,
2,2'-bis(2,4-dichlorophenyl)-4,4',5,5'-tetraphenyl-1,2'-biimidazole and
2,2'-bis(2,4,6-trichlorophenyl)-4,4',5,5'-tetraphenyl-1,2'-biimidazole are preferred, and 2,2'-bis(2-chlorophenyl)-4,4',5,5'-tetraphenyl-1,2'-biimidazole is particularly preferred.

The above biimidazole-based compounds may be used alone or in combination of two or more.

When the biimidazole-based compound is used as the other photopolymerization initiator in the present invention, the following hydrogen donor is added to the biimidazole-based compound to further improve sensitivity advantageously.

The term "hydrogen donor" as used herein means a compound which can provide a hydrogen atom to a radical formed from the biimidazole-based compound upon exposure.

The hydrogen donor is preferably a mercaptan-based compound or an amine-based compound defined hereinbelow.

The above mercaptan-based compound is a compound having a benzene ring or a hetero ring as a mother nucleus and 1 or more, preferably 1 to 3, more preferably 1 or 2 mercapto groups directly bonded to the mother nucleus (to be referred to as "mercaptan-based hydrogen donor" hereinafter).

The above amine-based compound is a compound having a benzene ring or a hetero ring as a mother nucleus and 1 or more, preferably 1 to 3, more preferably 1 or 2 amino groups directly bonded to the mother nucleus (to be referred to as "amine-based hydrogen donor" hereinafter).

These hydrogen donors may have a mercapto group and an amino group at the same time.

A detailed description is subsequently given of these hydrogen donors.

The mercaptan-based hydrogen donor may have at least one benzene ring or hetero ring, or both of them. When it has two or more of the rings, a fused ring may be formed.

When the mercaptan-based hydrogen donor has two or more mercapto groups, as long as at least one free mercapto group remains, at least one of the other mercapto groups may be substituted by an alkyl, aralkyl or aryl group. Further, as long as at least one free mercapto group remains, the mercaptan-based hydrogen donor may have a structural unit in which two sulfur atoms are bonded together by a divalent organic group such as an alkylene group or a structural unit in which two sulfur atoms are bonded together in the form of a disulfide.

Further, the mercaptan-based hydrogen donor may be substituted by a carboxyl group, substituted or nonsubstituted alkoxycarbonyl group, substituted or nonsubstituted phenoxycarbonyl group or nitrile group at a position other than the mercapto group(s).

Examples of this mercaptan-based hydrogen donor include 2-mercaptobenzothiazole, 2-mercaptobenzoxazole, 2-mercaptobenzoimidazole, 2,5-dimercapto-1,3,4-thiadiazole and 2-mercapto-2,5-dimethylaminopyridine.

Out of these mercaptan-based hydrogen donors, 2-mercaptobenzothiazole and 2-mercaptobenzoxazole are preferred, and 2-mercaptobenzothiazole is particularly preferred.

The amine-based hydrogen donor may have at least one benzene ring or hetero ring, or both of them. When it has two or more of the rings, a fused ring may be formed.

At least one amino group of the amine-based hydrogen donor may be substituted by an alkyl group or substituted alkyl group. The amine-based hydrogen donor may be substituted by a carboxyl group, substituted or nonsubstituted alkoxycarbonyl group, substituted or nonsubstituted phenoxycarbonyl group or nitrile group at a position other than the amino group(s).

Examples of the above amine-based hydrogen donor include 4,4'-bis(dimethylamino)benzophenone, 4,4'-bis(diethylamino)benzophenone, 4-diethylaminoacetophenone, 4-dimethylaminopropiophenone, ethyl 4-dimethylaminobenzoate, i-amyl 4-dimethylaminobenzoate, 4-dimethylaminobenzoic acid and 4-dimethylaminobenzonitrile.

Out of these amine-based hydrogen donors, 4,4'-bis(dimethylamino)benzophenone and 4,4'-bis(diethylamino)benzophenone are preferred, and 4,4'-bis(diethylamino)benzophenone is particularly preferred. 4,4'-bis(dimethylamino) benzophenone and 4,4'-bis(diethylamino) benzophenone can serve as a radiation sensitive polymerization initiator even when a biimidazole-based compound is not existent.

In the present invention, the above hydrogen donors may be used alone or in combination of two or more. A combination of at least one mercaptan-based hydrogen donor and at least one amine-based hydrogen donor is preferably used because a cured product obtained after exposure hardly falls off from the substrate and has high strength and sensitivity.

Preferred examples of the combination of the mercaptan-based hydrogen donor and the amine-based hydrogen donor include a combination of 2-mercaptobenzothiazole and
4,4'-bis(dimethylamino)benzophenone, a combination of 2-mercaptobenzothiazole and
4,4'-bis(diethylamino)benzophenone, a combination of 2-mercaptobenzoxazole and
4,4'-bis(dimethylamino)benzophenone, and a combination of 2-mercaptobenzoxazole and
4,4'-bis(diethylamino)benzophenone. Out of these combinations, a combination of 2-mercaptobenzothiazole and
4,4'-bis(diethylamino)benzophenone and a combination of 2-mercaptobenzoxazole and
4,4'-bis(diethylamino) benzophenone are more preferred, and a combination of 2-mercaptobenzothiazole and
4,4'-bis(diethylamino)benzophenone is particularly preferred.

The weight ratio of the mercaptan-based hydrogen donor to the amine-based hydrogen donor in the combination of the mercaptan-based hydrogen donor and the amine-based hydrogen donor is preferably 1:1 to 1:4, more preferably 1:1 to 1:3.

Examples of the above acetophenone-based compound include 2,2-dimethoxyacetophenone,
2,2-diethoxyacetophenone,
2,2-dimethoxy-2-phenylacetophenone,
2,2'-dimethoxy-1,2-diphenylethan-1-one,
2-hydroxy-2-methyl-1-phenylpropan-1-one,
1-(4-i-propylphenyl)-2-hydroxy-2-methylpropan-1-one,
1-[4-(methylthio)phenyl]-2-methyl-2-morpholinopropan-1-one, 4-(2-hydroxyethoxy)phenyl-(2-hydroxy-2-propyl)ketone,
1-(4-morpholinophenyl)-2-benzyl-2-dimethylaminobutan-1-one, 1-(2-bromo-4-morpholinophenyl)-2-benzyl-2-dimethylaminobutan-1-one,
1-(4-morpholinophenyl)-2-(2-bromobenzyl)-2-dimethylaminobutan-1-one,
1-(4-morpholinophenyl)-2-(4-bromobenzyl)-2-dimethylaminobutan-1-one, 1-hydroxycyclohexylphenyl ketone and 2,2-dimethoxy-1,2-diphenylethan-1-one.

Out of these acetophenone-based compounds,
2-methyl-1-[4-(methylthio)phenyl]-2-morpholinopropan-1-one,
1-(4-morpholinophenyl)-2-benzyl-2-dimethylaminobutan-1-one, 1-(2-bromo-4-morpholinophenyl)-2-benzyl-2-dimethylaminobutan-1-one and
1-(4-morpholinophenyl)-2-(4-bromobenzyl)-2-dimethylaminobutan-1-one are preferred.

In the present invention, even when an acetophenone-based compound is used as the other polymerization initiator, at least one of the above hydrogen donors may be added.

Examples of the above benzophenone-based compound include benzophenone, 4,4'-bis(dimethylamino)benzophenone and 4,4'-bis(diethylamino)benzophenone.

Examples of the above benzoin-based compound include benzoin, benzoin methyl ether, benzoin ethyl ether, benzoin isopropyl ether, benzoin isobutyl ether and methyl-2-benzoyl benzoate.

Examples of the above α-diketone-based compound include diacetyl, dibenzoyl and methylbenzoyl formate.

Examples of the above polynuclear quinone-based compound include anthraquinone, 2-ethylanthraquinone, 2-t-butylanthraquinoen and 1,4-naphthoquinone.

Examples of the above xanthone-based compound include xanthone, thioxanthone and 2-chlorothioxanthone.

Examples of the above phosphine-based compound include bis(2,4,6-trimethylbenzoyl)phenylphosphine oxide and 2,4,6-trimethylbenzoyldiphenylphosphine oxide.

Examples of the above triazine-based compound include triazine-based compounds having a halomethyl group such as 2,4,6-tris(trichloromethyl)-s-triazine,
2-methyl-4,6-bis(trichloromethyl)-s-triazine,
2-[2-(furan-2-yl)ethenyl]-4,6-bis(trichloromethyl)-s-triazine, 2-[2-(5-methylfuran-2-yl)ethenyl]-4,6-bis(trichloromethyl)-s-triazine,
2-[2-(4-diethylamino-2-methylphenyl)ethenyl]-4,6-bis(trichloromethyl)-s-triazine,
2-[2-(3,4-dimethoxyphenyl)ethenyl]-4,6-bis (trichloromethyl)-s-triazine,
2-(4-methoxyphenyl)-4,6-bis(trichloromethyl)-s-triazine,
2-(4-ethoxystyryl)-4,6-bis(trichloromethyl)-s-triazine,
2-(4-n-butoxyphenyl)-4,6-bis(trichloromethyl)-s-triazine,
compound represented by the following formula (5) and compound represented by the following formula (6).

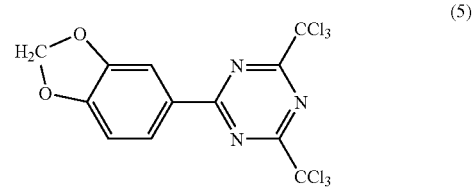

(5)

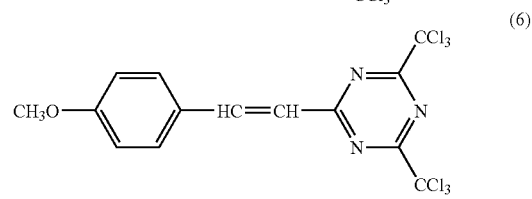

(6)

Examples of the above carbazole-based compound include
1-[9-ethyl-6-benzoyl-9.H.-carbazol-3-yl]nonane-1,2-nonane-2-oxime-O-benzoate,
1-[9-ethyl-6-benzoyl-9.H.-carbazol-3-yl]nonane-1,2-nonane-2-oxime-O-acetate,
1-[9-ethyl-6-benzoyl-9.H.-carbazol-3-yl]pentane-1,2-pentane-2-oxime-O-acetate,
1-[9-ethyl-6-benzoyl-9.H.-carbazol-3-yl]octan-1-oneoxime-O-acetate,
1-[9-ethyl-6-(2-methylbenzoyl)-9.H.-carbazol-3-yl]ethan-1-oneoxime-O-benzoate,
1-[9-ethyl-6-(2-methylbenzoyl)-9.H.-carbazol-3-yl]ethan-1-oneoxime-O-acetate,
1-[9-ethyl-6-(2,4,6-trimethylbenzoyl)-9.H.-carbazol-3-yl] ethan-1-oneoxime-O-benzoate and 1-[9-n-butyl-6-(2-ethylbenzoyl)-9.H.-carbazol-3-yl]ethan-1-oneoxime-O-benzoate.

Out of these carbazole-based compounds, 1-[9-ethyl-6-(2-methylbenzoyl)-9.H.-carbazol-3-yl]ethan-1-oneoxime-O-acetate is particularly preferred.

The above other photopolymerization initiators may be used alone or in combination of two or more.

In the present invention, the amount of the photopolymerization initiator is preferably 0.1 to 30 parts by weight, more preferably 1 to 20 parts by weight, particularly preferably 1 to 10 parts by weight based on 100 parts by weight of the photopolymerizable unsaturated compound (B). When the amount of the photopolymerization initiator is smaller than 0.1 part by weight, curing by exposure becomes incomplete and a sufficiently hard printing pattern may not be obtained due to a curing failure such as the existence of the residual tackiness. When the amount is larger than 30 parts by weight, a sufficiently hard printing pattern may not be obtained.

The amount of the other photopolymerization initiator is preferably 80 wt % or less, more preferably 70 wt % or less based on the total of the photopolymerization initiator (1) and the other photopolymerization initiator. When the amount of the other photopolymerization initiator is larger than 80 wt %, the desired effect of the present invention may be impaired.

Further, in the present invention, at least one of a sensitizer, a curing accelerator and a polymer photocrosslinking/sensitizing agent may be optionally used in combination with the above photopolymerization initiator.

Additives

The energy beam curable type ink jet printing ink of the present invention may contain various additives as required.

The additives include a polymerization inhibitor for enhancing the storage stability of the ink, age inhibitor for providing weatherability to a cured film after printing, and an ultraviolet absorber.

The above additives further include, for example, a dispersion aid such as a blue pigment derivative or yellow pigment derivative exemplified by a copper phthalocyanine derivative; filler such as glass or alumina; polymer compound such as polyvinyl alcohol, polyethylene glycol monoalkyl ether or poly(fluoroalkylacrylate); surfactant such as a nonionic, cationic or anionic surfactant; adhesion accelerator such as vinyl trimethoxysilane, vinyl triethoxysilane, vinyl tris(2-methoxyethoxy)silane, N-(2-aminoethyl)-3-aminopropyl-methyl-dimethoxysilane, N-(2-aminoethyl)-3-aminopropyltri-methoxysilane, 3-aminopropyltriethoxysilane, 3-glycidoxypropyltrimethoxysilane, 3-glycidoxypropyl methyl dimethoxysilane, 2-(3,4-epoxycyclohexyl)ethyltri-methoxysilane, 3-chloropropyl methyl dimethoxysilane, 3-chloropropyltrimethoxysilane, 3-methacryloyloxypropylt-rimethoxysilane or 3-mercaptopropyltrimethoxysilane; antioxidant such as 2,2'-thiobis(4-methyl-6-t-butylphenol) or 2,6-di-t-butylphenol; ultraviolet absorber such as 2-(3-t-butyl-5-methyl-2-hydroxyphenyl)-5-chlorobenzotriazole or alkoxybenzophenone; cohesion inhibitor such as sodium polyacrylate; and thermal radical generator such as 1,1'-azobis(cyclohexane-1-carbonitrile) or 2-phenylazo-4-methoxy-2,4-dimethylvaleronitrile.

It is desired that the viscosity of the energy beam curable type ink jet printing ink of the present invention should be 30 mPa·s or less, preferably 5 to 24 mPa·s at normal temperature. When the ink has the above viscosity, it can be continuously ejected from the nozzle head stably and high-resolution printed matter can be obtained stably.

Printing Method

A description is subsequently given of a printing method using the energy beam curable type ink jet printing ink of the present invention (to be simply referred to as "printing ink of the present invention" hereinafter).

This printing method basically comprises the steps of:

[I] printing the ink of the present invention on the surface of a material to be printed by an ink jet system; and

[II] crosslinking and curing the ink by exposure to an energy beam. The energy beam curable type ink jet printing ink of the present invention can be widely applied to printing systems other than the ink jet system, such as a printing system using a spinner.

The "energy beam" used in the present invention means ultraviolet radiation, far ultraviolet radiation, X-ray, electron beam, molecular beam, γ-ray, synchrotron radiation or proton beam.

A description is subsequently given of each of the above steps.

—Step [I]—

The printing ink of the present invention can be used for various materials to be printed such as non-coated paper, coated paper, plastics, rubbers, wooden materials, metals, glasses and ceramics whether they have ink absorbability or not.

The above plastics include polyesters (such as polyethylene terephthalate and polybutylene terephthalate), polycarbonates, polyacetals, OPS, OPP, ONy, TAC, polyethylene, polyvinyl chloride, acrylic resin, impact resistant styrene-based resins (such as ABS resin) and polyvinyl alcohols. These plastics may be used whether they have heat shrinkability or not.

The above rubbers include olefin-based rubbers (such as ethylene-propylene rubber, ethylene-propylene-nonconjugated diene rubber and butyl rubber), halogen-containing rubbers (such as chlorinated polyolefin-based rubber and fluorine rubber), styrene-based block copolymers (such as styrene-butadiene-based, styrene-butadiene-styrene-based, styrene-isoprene-based and styrene-isoprene-styrene-based block copolymers), polyurethane-based elastomers, polyester-based elastomers and polyamide-based elastomers. These rubbers may be used whether they are vulcanized or crosslinked or not.

To print the surface of a material to be printed, the printing ink and the nozzle head are maintained at a constant temperature of preferably 10 to 100° C., more preferably 15 to 60° C. to enable the ink to be continuously ejected stably.

The amount of the printing ink ejected from the nozzle head is preferably 2 to 15 picoliters/sec, more preferably 4 to 12 picoliters/sec.

To print the surface of a material to be printed, the amount of the printing ink which differs according to the use purpose of the material to be printed is such that the total thickness of the film after curing becomes preferably 1 to 25 µm, more preferably 3 to 15 µm.

—Step [II]—

Exposure is desirably carried out preferably 0.001 to 2.0 seconds, more preferably 0.001 to 1.0 second after the landing of the printing ink. To carry out high-resolution printing, the exposure timing is preferably early.

For printing, the printing ink may be printed on a single layer or multiple layers in a single color or multiple colors. When the printing ink is printed on multiple layers, it is desirably exposed after the printing of each layer.

The energy beam used for exposure is, for example, ultraviolet radiation, far ultraviolet radiation, X-ray, electron beam, molecular beam, γ-ray, synchrotron radiation or proton beam. It is desirably ultraviolet radiation including a wavelength of preferably 200 to 500 nm, more preferably 240 to 420 nm. The total consumption power of a light source used in the ink jet system is generally more than 1 kW·hr. The printing ink of the present invention enables the use of a light source having high sensitivity and a total consumption power of 1 kW·hr or less, such as a fluorescent tube, cold-cathode tube or light emitting diode (LED).

The exposure is preferably 1,000 to 15,000 J/m$^2$, more preferably 3,000 to 10,000 J/m$^2$.

As for the exposure method, methods described in JP-A 60-132767 and U.S. Pat. No. 6,145,979, specifically a shuttle system and an optical fiber system may be employed.

As described above, the energy beam curable type ink jet printing ink of the present invention has low viscosity, high sensitivity and sufficiently high film strength after curing and can provide high-resolution high-quality printed matter at a high yield stably.

EXAMPLES

The following examples are provided for the purpose of further illustrating the present invention. It is to be understood that the present invention is not limited by the following examples.

Example 1

1.2 parts by weight of C.I. Pigment Blue 15:6 as a colorant (A), 0.2 part by weight of the Solsperse S24000 as a dispersant, 23.9 parts by weight of di(ethylene glycol)dimethacrylate, 3.3 parts by weight of isobornyl acrylate, 3.3 parts by weight of poly(ethylene glycol)diacrylate, 8.9 parts by weight of tetra(ethylene glycol)diacrylate, 17.6 parts by weight of pentaerythritol tetraacrylate, 23.4 parts by weight of N-vinylpyrrolidone and 10.2 parts by weight of triethylene glycol divinyl ether as photopolymerizable unsaturated compounds (B), and 1.3 parts by weight of 2-(4-methylbenzyl)-2-(dimethylamino)-1-(4-morpholinophenyl)butan-1-one (trade name: Irgacure 379, manufactured by Ciba Specialty Chemicals Co., Ltd., the same shall apply hereinunder), 4.1 parts by weight of 2,2'-dimethoxy-1,2-diphenylethan-1-one (trade name: Irgacure 651, manufactured by Ciba Specialty Chemicals Co., Ltd., the same shall apply hereinunder) and 2.0 parts by weight of bis(2,4,6-trimethyl)-phenylphosphine oxide (trade name: Irgacure 819, manufactured by Ciba Specialty Chemicals Co., Ltd. the same shall apply hereinunder) as photopolymerization initiators (C) were mixed together to prepare a printing ink.

The obtained printing ink was evaluated as follows.

When the viscosity of the printing ink (25° C.) was measured by the ELD viscometer of Tokyo Keiki Co., Ltd., it was 9.7 Pa·s.

After the printing ink was applied to the surface of a polycarbonate substrate with a spinner, the formed coating film was exposed by a metal halide lamp repeatedly at an exposure of 1,000 J/m$^2$ each time until it was confirmed by finger touch that tackiness was gone. When the total exposure (required exposure) required until tackiness was gone was measured, it was 7,000 J/m$^2$.

After the printing ink was applied to the surface of a polycarbonate substrate with a spinner, the formed coating film was exposed by a metal halide lamp at an exposure of 10,000 J/m$^2$ to form a cured film having a thickness of 4.0 μm on the substrate. Thereafter, the pencil hardness was measured by carrying out a 8.4.1 pencil scratch test on the cured film in accordance with JIS K-5400-1990, it was [B].

The above results are shown in Table 1 ("parts" means parts by weight, the same shall apply hereinunder).

Examples 2 to 16 and Comparative Examples 1 and 2

Printing inks were prepared and evaluated in the same manner as in Example 1 except that the types and amounts of components were changed as shown in Table 1 (Examples 2 to 10) and Table 2 (Examples 11 to 16 and Comparative Examples 1 and 2).

The evaluation results are shown in Table 1 and Table 2.

The components in Table 1 and Table 2 are given below.

(A) colorants
A-1: C.I. Pigment Blue 15:6
A-2: C.I. Pigment Red 202
A-3: C.I. Pigment Violet 19
A-4: C.I. Pigment Yellow 180
A-5: C.I. Pigment Yellow 168
A-6: C.I. Pigment White 6
A-7: C.I. Pigment Black 7

(B) Photopolymerizable Unsaturated Compounds
B1-1: di(ethylene glycol)dimethacrylate (trade name: 2EG, manufactured by Kyoeisya Chemical Co., Ltd.)
B1-2: ethylene glycol dimethacrylate (trade name: EG, manufactured by Kyoeisya Chemical Co., Ltd.)
B2-1: isobornyl acrylate (trade name: IB-XA, manufactured by Kyoeisya Chemical Co., Ltd.)
B2-2: poly(ethylene glycol)diacrylate (trade name: 4EG-A, manufactured by Kyoeisya Chemical Co., Ltd.)
B2-3: tetra(ethylene glycol)diacrylate (trade name: SR268, manufactured by Thertomer Co., Ltd.)
B2-4: pentaerythritol tetraacrylate (trade name: M-450, manufactured by Toagosei Chemical Industry Co., Ltd.)
B2-5: ethoxylated pentaerythritol tetraacrylate represented by the following formula (7) (trade name: ATM-4E, manufactured by Shin Nakamura Kagaku Kogyo Co., Ltd.)
B3-1: N-vinylpyrrolidone (trade name: M-150, manufactured by Toagosei Chemical Industry Co., Ltd.)
B3-2: tri(ethylene glycol)divinyl ether (trade name: TDVE, manufactured by Maruzen Petrochemical Co., Ltd.)
B3-3: N-vinyl-ε-caprolactam
B3-4: 2-(2'-vinyloxyethoxy)ethyl acrylate (trade name: VEEA, manufactured by Nippon Shokubai Co., Ltd.)
B3-5: 2-(2'-vinyloxyethoxy)ethyl methacrylate (trade name: VEEM, manufactured by Nippon Shokubai Co., Ltd.)

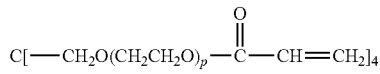

(7)

(p is about 1.)

(C) Photopolymerization Initiators
C1-1: 2-(4-methylbenzyl)-2-(dimethylamino)-1-(4-morpholinophenyl)butan-1-one (trade name: Irgacure 379, manufactured by Ciba Specialty Chemicals Co., Ltd.)
C2-1: 2,2'-dimethoxy-1,2-diphenylethan-1-one (trade name: Irgacure 651, manufactured by Ciba Specialty Chemicals Co., Ltd.)
C2-2: bis(2,4,6-trimethylbenzoyl)phenylphosphine oxide (trade name: Irgacure 819, manufactured by Ciba Specialty Chemicals Co., Ltd.)
C2-3: benzophenone
C2-4: 4,4'-bis(diethylamino)benzophenone Additives
D-1: Solsperse S24000 (trade name, manufactured by Seneka Co., Ltd.)

TABLE 1

| | Example | | | | | | | | | |
|---|---|---|---|---|---|---|---|---|---|---|
| | 1 | 2 | 3 | 4 | 5 | 6 | 7 | 8 | 9 | 10 |
| (A) colorant (parts) | | | | | | | | | | |
| A-1 | 1.2 | 1.2 | 2.0 | 1.2 | 2.0 | 2.0 | 1.2 | 2.0 | 2.0 | 1.2 |
| A-2 | — | — | — | — | — | — | — | — | — | — |
| A-3 | — | — | — | — | — | — | — | — | — | — |
| A-4 | — | — | — | — | — | — | — | — | — | — |
| A-5 | — | — | — | — | — | — | — | — | — | — |
| A-6 | — | — | — | — | — | — | — | — | — | — |
| A-7 | — | — | — | — | — | — | — | — | — | — |
| (B) photo-polymerizable unsaturated compound (parts) | | | | | | | | | | |
| B1-1 | 23.9 | 7.6 | 10.2 | 7.7 | 10.3 | 10.4 | 12.1 | 10.2 | 10.2 | 23.9 |
| B1-2 | — | 25.8 | 24.3 | 26.0 | 24.5 | 23.8 | — | 24.3 | 24.3 | — |
| B2-1 | 3.3 | 2.4 | 4.0 | 2.4 | 4.1 | 4.1 | 3.3 | 4.0 | 4.0 | 3.3 |
| B2-2 | 3.3 | — | — | — | — | — | 3.3 | — | — | 3.3 |
| B2-3 | 8.9 | 16.2 | 15.2 | 16.3 | 15.4 | 15.0 | 25.2 | 15.2 | 15.2 | 8.9 |
| B2-4 | 17.6 | 14.0 | 13.3 | 14.1 | 13.3 | 13.5 | 10.0 | 13.3 | 13.3 | 17.6 |
| B2-5 | — | — | — | — | — | — | 13.7 | — | — | — |
| B3-1 | 23.4 | 23.2 | 21.8 | 23.4 | 22.0 | 22.2 | 23.5 | 10.9 | 10.9 | — |
| B3-2 | 10.2 | — | — | — | — | — | — | — | — | 10.2 |
| B3-3 | — | — | — | — | — | — | — | — | — | 23.4 |
| B3-4 | — | — | — | — | — | — | — | 10.9 | — | — |
| B3-5 | — | — | — | — | — | — | — | — | 10.9 | — |
| (C) photo-polymerization initiator (parts) | | | | | | | | | | |
| C1-1 | 1.3 | 1.3 | 1.2 | 1.3 | 1.2 | 0.5 | 1.3 | 1.2 | 1.2 | 1.3 |
| C2-1 | 4.1 | 4.1 | 3.8 | 4.1 | 3.8 | — | 4.1 | 3.8 | 3.8 | 4.1 |
| C2-2 | 2.0 | 2.0 | 1.9 | 2.0 | 1.9 | — | 2.0 | 1.9 | 1.9 | 2.0 |
| C2-3 | — | — | — | — | — | 4.4 | — | — | — | — |
| C2-4 | — | — | — | — | 1.0 | 1.7 | — | — | — | — |
| Additive (parts) | | | | | | | | | | |
| D-1 | 0.2 | 0.2 | 0.4 | 0.2 | 0.4 | 0.4 | 0.2 | 0.4 | 0.4 | 0.2 |
| Evaluation | | | | | | | | | | |
| Viscosity (Pa·s) | 9.7 | 8.0 | 8.3 | 8.5 | 8.7 | 8.3 | 14.2 | 8.9 | 9.0 | 9.5 |
| Required exposure (J/m$^2$) | 7000 | 8000 | 8000 | 9000 | 9000 | 9000 | 8000 | 8000 | 8000 | 9000 |
| Pencil hardness | B | HB | HB | HB | HB | HB | HB | HB | HB | HB |

TABLE 2

| | Example | | | | | | Comparative Example | |
|---|---|---|---|---|---|---|---|---|
| | 11 | 12 | 13 | 14 | 15 | 16 | 1 | 2 |
| (A) colorant (parts) | | | | | | | | |
| A-1 | — | — | — | — | — | — | 1.2 | 1.2 |
| A-2 | 0.6 | — | — | — | — | 1.5 | — | — |
| A-3 | 0.6 | — | — | — | — | 1.5 | — | — |
| A-4 | — | 1.2 | — | — | — | — | — | — |
| A-5 | — | — | 1.2 | — | — | — | — | — |
| A-6 | — | — | — | 1.2 | — | — | — | — |
| A-7 | — | — | — | — | 1.2 | — | — | — |
| (B) photo-polymerizable unsaturated compound (Parts) | | | | | | | | |
| B1-1 | 23.9 | 23.9 | 23.9 | 23.9 | 23.9 | 14.9 | 23.6 | — |
| B1-2 | — | — | — | — | — | 24.1 | — | — |

TABLE 2-continued

|  | Example | | | | | | Comparative Example | |
| --- | --- | --- | --- | --- | --- | --- | --- | --- |
|  | 11 | 12 | 13 | 14 | 15 | 16 | 1 | 2 |
| B2-1 | 3.3 | 3.3 | 3.3 | 3.3 | 3.3 | 6.6 | 3.3 | 3.3 |
| B2-2 | 3.3 | 3.3 | 3.3 | 3.3 | 3.3 | — | 3.3 | 35.5 |
| B2-3 | 8.9 | 8.9 | 8.9 | 8.9 | 8.9 | — | 8.8 | — |
| B2-4 | 17.6 | 17.6 | 17.6 | 17.6 | 17.6 | 11.1 | 17.4 | 27.0 |
| B2-5 | — | — | — | — | — | — | — | — |
| B3-1 | 23.4 | 23.4 | 23.4 | 23.4 | 23.4 | 19.1 | 23.5 | 23.3 |
| B3-2 | 10.2 | 10.2 | 10.2 | 10.2 | 10.2 | — | 10.1 | — |
| B3-3 | — | — | — | — | — | — | — | — |
| B3-4 | — | — | — | — | — | — | — | — |
| B3-5 | — | — | — | — | — | — | — | — |
| (C) photopolymerization initiator (Parts) | | | | | | | | |
| C1-1 | 1.3 | 1.3 | 1.3 | 1.3 | 1.3 | 1.1 | — | 2.6 |
| C2-1 | 4.1 | 4.1 | 4.1 | 4.1 | 4.1 | 3.3 | 4.1 | 3.6 |
| C2-2 | 2.0 | 2.0 | 2.0 | 2.0 | 2.0 | 1.6 | 4.3 | — |
| C2-3 | — | — | — | — | — | — | — | — |
| C2-4 | — | — | — | — | — | — | — | — |
| Additive (parts) | | | | | | | | |
| D-1 | 0.2 | 0.2 | 0.2 | 0.2 | 0.2 | 0.2 | 0.2 | 0.2 |
| Evaluation | | | | | | | | |
| Viscosity (Pa·s) | 10.0 | 11.0 | 10.0 | 9.8 | 10.5 | 8.5 | (*) | 23.0 |
| Required exposure (J/m²) | 8000 | 9000 | 7000 | 8000 | 9000 | 7000 | (*) | 5000 |
| Pencil hardness | HB | HB | HB | HB | HB | HB | (*) | HB |

(*) not become a homogeneous solution and not measurable.

The invention claimed is:

1. An energy beam curable ink jet printing ink comprising
(A) a colorant,
(B) a compound having at least one ethylenically unsaturated bond which can be polymerized by the application of an energy beam and
(C) a photopolymerization initiator,
wherein the component (B) comprises
(b1) a compound wherein the only unsaturated polymerizable group is a methacryloyl group wherein said compound may have one or more methacryloyl group,
(b2) a compound wherein the only unsaturated polymerizable group is a acryloyl group wherein said compound may have one or more acryloyl group, and
(b3) a compound having at least one vinyl group as a polymerizable unsaturated group, wherein the compound of component (b3) is not the same as the compound of component (b1) or component (b2), and wherein the component (C) is a compound represented by the following formula (1):

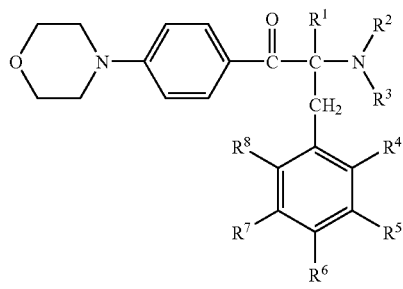

(1)

wherein $R^1$ is a linear, branched or cyclic alkyl group having 1 to 12 carbon atoms, $R^2$ and $R^3$ are each independently a hydrogen atom; a linear, branched or cyclic alkyl group having 1 to 12 carbon atoms; or a benzyl group, $R^4$, $R^5$, $R^7$ and $R^8$ are each independently a hydrogen atom; a halogen atom; a linear, branched or cyclic alkyl group having 1 to 12 carbon atoms; or a linear or branched alkoxy group having 1 to 4 carbon atoms, and $R^6$ is a halogen atom; a linear, branched or cyclic alkyl group having 1 to 12 carbon atoms; a linear, branched or cyclic alkyl group having 1 to 12 carbon atoms substituted by a substituent selected from the group consisting of a hydroxyl group and a linear or branched alkoxyl group having 1 to 4 carbon atoms; a linear or branched alkoxyl group having 1 to 4 carbon atoms; or a linear or branched alkoxyl group having 2 to 4 carbon atoms substituted by a substituent selected from the group consisting of a hydroxyl group and a linear or branched alkoxyl group having 1 to 4 carbon atoms.

2. The energy beam curable ink jet printing ink according to claim 1, wherein (b1) is at least one compound selected from the group consisting of the compound of formula (2-1), the compound of formula (2-2), the compound of formula (3-1), and the compound of formula (3-2)

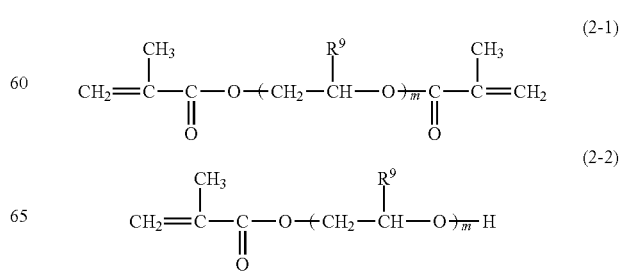

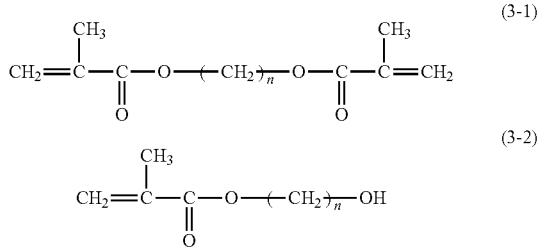

wherein $R^9$ is a hydrogen atom or methyl group, m is an integer of 1 to 5, and n is an integer of 3 to 9.

3. The energy beam curable ink jet printing ink according to claim 2, wherein (b1) is the compound of formula (2-1).

4. The energy beam curable ink jet printing ink according to claim 2, wherein (b1) is the compound of formula (2-2).

5. The energy beam curable ink jet printing ink according to claim 2, wherein (b1) is the compound of formula (3-1).

6. The energy beam curable ink jet printing ink according to claim 2, wherein (b1) is the compound of formula (3-2).

7. The energy beam curable ink jet printing ink according to claim 1, wherein the component (A) further comprises a dispersant.

8. The energy beam curable ink jet printing ink according to claim 1, wherein the content of the colorant is 0.5 to 10 wt %.

9. The energy beam curable ink jet printing ink according to claim 1, wherein the content of the compound having only at least one methacryloyl group (b1) is 2 to 100 parts by weight based on 2 parts by weight of the colorant.

10. The energy beam curable ink jet printing ink according to claim 1, wherein the amount of the compound having only at least one acryloyl group (b2) is 400 parts or less by weight based on 20 parts by weight of the compound having only at least one methacryloyl group (b1).

11. The energy beam curable ink jet printing ink according to claim 1, wherein the amount of the compound having at least one vinyl group (excluding the component (b2)) as a polymerizable unsaturated group (b3) is 400 parts or less by weight based on 20 parts by weight of the compound having only at least one methacryloyl group (b1).

12. The energy beam curable ink jet printing ink according to claim 1, wherein the photopolymerization initiator is selected from the group consisting of 2-(4-methylbenzyl)-2-(dimethylamino)-1-(4-morpholinophenyl)butan-1-one, 2-(4-ethylbenzyl)-2-(dimethylamino)-1-(4-morpholinophenyl) butan-1-one, 2-(4-1-propylbenzyl)-2-(dimethylamino)-1-(4-morpholinophenyl)butan-1-one, 2-(4-n-butylbenzyl)-2-(dimethylamino)-1-(4-morpholinophenyl)butan-1-one, 2-(4-1-butylbenzyl)-2-(dimethylamino)-1-(4-morpholinophenyl) butan-1-one, 2-(4-n-dodecylbenzyl)-2-(dimethylamino)-1-(4-morpholinophenyl)butan-1-one, 2-(3,4-dimethylbenzyl)-2-(dimethylamino)-1-(4-morpholinophenyl)butan-1-one, 2-(4-methoxybenzyl)-2-(dimethylamino)-1-(4-morpholinophenyl)butan-1-one, 2-(4-ethoxybenzyl)-2-(dimethylamino)-1-(4-morpholinophenyl)butan-1-one, 2-(4-hydroxymethylbenzyl)-2-(dimethylamino)-1-(4-morpholinophenyl)butan-1-one, 2-[4-(2-hydroxyethoxy)benzyl]-2-(dimethylamino)-1-(4-morpholinophenyl)butan-1-one, 2-[4-(2-methoxyethoxy)benzyl]-2-(dimethylamino)-1-(4-morpholinophenyl)butan-1-one, 2-(4-1-propylbenzyl)-2-[(n-butyl)(methyl)amino]-1-(4-morpholinophenyl)butan-1-one, 2-(4-n-butylbenzyl)-2-[(n-butyl)(methyl)amino]-1-(4-morpholinophenyl)butan-1-one, 2-(4-1-propylbenzyl)-2-(dimethylamino)-1-(4-morpholinophenyl)pentan-1-one, 2-(4-i-butylbenzyl)-2-[(n-butyl)(methyl)amino]-1-(4-morpholinophenyl)pentan-1-one, 2-(4-n-butoxybenzyl)-2-[(n-butyl)(methyl)amino]-1-(4-morpholinophenyl)pentan-1-one, 2-(4-methylbenzyl)-2-[di(n-octyl)amino]-1-(4-morpholinophenyl)hexan-1-one and 2-(4-n-dodecylbenzyl)-2-(dimethylamino)-1-(4-morpholinophenyl)octan-1-one.

13. The energy beam curable ink jet printing ink according to claim 1, wherein the photopolymerization initiator is selected from the group consisting of 2-(4-methylbenzyl)-2-(dimethylamino)-1-(4-morpholinophenyl)butan-1-one, 2-(4-ethylbenzyl)-2-(dimethylamino)-1-(4-morpholinophenyl) butan-1-one and 2-(4-1-propylbenzyl)-2-(dimethylamino)-1-(4-morpholinophenyl)butan-1-one.

14. The energy beam curable ink jet printing ink according to claim 1, further comprising at least one additional photopolymerization initiator compound, other than the photopolymerization initiator of formula (1), selected from the group consisting of biimidazole-based photopolymerization initiator compound having at least one main skeleton represented by the following formula (4-1), (4-2) or (4-3), acetophenone-based photopolymerization initiator compound compound, benzophenone-based photopolymerization initiator compound compound, benzoin-based photopolymerization initiator compound compound, α-diketone-based photopolymerization initiator compound compound, polynuclear quinone-based photopolymerization initiator compound compound, xanthone-based photopolymerization initiator compound compound, phosphine-based photopolymerization initiator compound compound, triazine-based photopolymerization initiator compound compound and carbazole-based photopolymerization initiator compound compound,

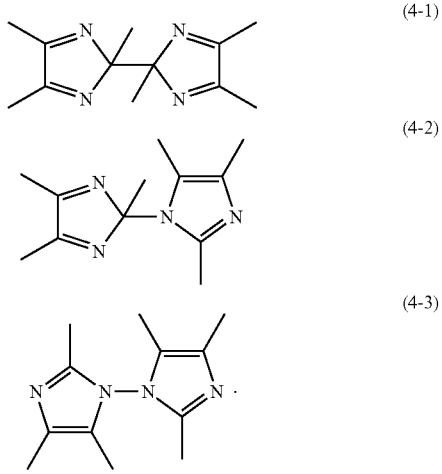

15. The energy beam curable ink jet printing ink according to claim 14, wherein the additional photopolymerization initiator compound is a biimidazole-based photopolymerization initiator compound selected from the group consisting of 2,2'-bis(2-chlorophenyl)-4,4',5,5'-tetrakis(4-ethoxycarbonylphenyl)-1,2'-biimidazole, 2,2'-bis(2-bromophenyl)-4,4',5,5'-tetrakis(4-ethoxycarbonylphenyl)-1,2'-biimidazole, 2,2'-bis(2-chlorophenyl)-4,4',5,5'-tetraphenyl-1,2'-biimidazole, 2,2'-bis(2,4-dichlorophenyl)-4,4',5,5'-tetraphenyl-1,2'-biimidazole, 2,2'-bis(2,4,6-trichlorophenyl)-4,4',5,5'-tetraphenyl-1,2'-biimidazole, 2,2'-bis(2-bromophenyl)-4,4',5,5'-tetraphenyl-1,2'-biimidazole, 2,2'-bis(2,4-dibromophenyl)-4,4', 5,5'-tetraphenyl-1,2'-biimidazole and 2,2'-bis(2,4,6-tribromophenyl)-4,4',5,5'-tetraphenyl-1,2'-biimidazole.

16. The energy beam curable ink jet printing ink according to claim 14, wherein the amount of the total amount of photopolymerization initiator is 0.1 to 30 parts by weight based on 100 parts by weight of the component (B).

17. The energy beam curable ink jet printing ink according to claim 16, wherein the at least one additional photopolymerization initiator compound is 80 wt % or less based on the total of the photopolymerization initiator of component (C) and the at least one additional photopolymerization initiator compound.

18. The energy beam curable ink jet printing ink according to claim 14, other photopolymerization initiator is preferably 80 wt % or less, more preferably 70 wt % or less based on the total of the photopolymerization initiator of formula (1) and the other photopolymerization initiator.

19. The energy beam curable ink jet printing ink according to claim 1, further comprising one or more additives selected from the group consisting of a dispersion aid, a filler, a polyvinyl alcohol, a polyethylene glycol monoalkyl ether, a poly (fluoroalkylacrylate), a nonionic surfactant, a cationic surfactant, a anionic surfactant, an adhesion accelerator, an antioxidant, an ultraviolet absorber, a cohesion inhibitor, and a thermal radical generator.

20. The energy beam curable ink jet printing ink according to claim 1, wherein said ink has a viscosity of 30 mPa·s or less at normal temperature.

\* \* \* \* \*